3,457,886
SEWING APPARATUS AND CONTROL MEANS
THEREFOR
Robert L. Kosrow, Hoffman Estates, and Peter Vischer,
Palatine, Ill., assignors to Union Special Machine Company, Chicago, Ill., a corporation of Illinois
Filed June 6, 1967, Ser. No. 643,973
Int. Cl. D05b 23/00; D05c 3/02, 7/04
U.S. Cl. 112—121.15                                28 Claims

ABSTRACT OF THE DISCLOSURE

Sewing apparatus and control means therefor by which the sewing and work handling operations are at times automatically controlled, and at other times are quickly converted to manual control. The apparatus is such that a series of seaming and work turning operations are performed on successive workpieces fed to the machine. Normally, the control over the various operations is automatically achieved, but whenever a departure from the automatic control is desired, to bring about a separate line or series of lines of stitching in relation to some or all of the workpieces supplied to the machine, this is achieved by a manual control, preferably initiated by a foot treadle. The latter serves to interrupt the automatic control and enables the operator to control the operation of the machine and to turn the workpieces as desired. Restoration of the automatic control is brought about upon completion of the desired manual control by appropriate operation of the foot treadle, or the like. When the automatic control is thus restored, the apparatus will resume its performance of a particular cycle or series of steps from the point at which the latter was interrupted. The manually operable means, such as the foot treadle, incorporated in the apparatus is adapted to control the starting and stopping of the sewing machine, and it also modifies to a certain extent the electrical circuitry or other energy providing means that controls the automatic operation of various devices in the apparatus.

Detailed disclosure

This invention relates to control means for sewing machines which enables the latter to be automatically operated to perform a specific seaming operation, and more particularly a succession of seaming and work turning operations on each of a plurality of workpieces fed to the machine, and which enables such automatic operation to be interrupted whenever desired to permit manual control over the operation of the machine. The arrangement is such, moreover, that whenever the automatic control over the operation of the machine is interrupted and then later resumed, the particular cycle of automatically performed steps will be resumed and completed. Thus, if the interruption occurs at a particular point in a cycle of steps, the balance of those steps will be carried out upon resumption of the automatic control.

One form or embodiment of the present invention makes possible the automatic control over the operation of sewing apparatus of the general character of that disclosed in the pending Kosrow application Ser. No. 564,-613, filed on July 12, 1966. In addition, it makes possible the interruption of the automatic control over the operation of such apparatus whenever desired and places its operation under manual control for the performance of any desired seaming and work handling operations. As stated hereinabove, whenever the desired manual control is completed, and the apparatus is restored to automatic control, the apparatus will complete the cycle of steps which it has been set to automatically carry out on successive workpieces.

An important advantage of the invention is that it permits a predetermined cycle of seaming and work turning operations, for example, to be automatically performed on successive workpieces, and also permits the introduction into any of such cycles of operation of any additional seaming and work handling steps that may be desired under manual control.

A special feature of the invention is the provision of a simple, separate unit which may be applied as an attachment to apparatus normally constructed for only automatite operation and control. The attachment or unit mentioned is provided with a special manually controlled member, such as a foot treadle, and a plurality of electrical switches operated by said treadle and other manually operated means. These switches are adapted to be readily connected into the automatic control circuitry of the system to enable interruption of the automatic control whenever desired, and its replacement by manual control over the seaming and work handling and other operations to be performed.

In a preferred embodiment of the invention there is provided a special form of connection between a foot treadle and a lever which is adapted to be operated upon rocking of the treadle to cause engagement of a clutch in the drive connection between a motor and the sewing machine. The special connection involves a Bowden cable, i.e. a flexible cable having an outer sheath member and an inner core element which are relatively movable in an axial direction in relation to each other. Normally the operational control is exercised by manually shifting one end of the core element and having the resultant movement of the opposite end of the core element impart the desired movement to the member to be operated. In accordance with the present invention, however, one end of the sheath is held in fixed position while its opposite end is connected with the clutch operating lever. Shifting of the inner core element relative to the sheath causes the latter to flex or bend to a certain extent, thereby shortening its effective length and causing the desired operation of the clutch lever. It has been found that this shortens the required length of the cable and simplifies the nature of the connections between a foot treadle and a clutch lever, for example.

While the power or energy means to be hereinafter disclosed for operating certain control members is electrical, and the control members are solenoids, these may be replaced by pneumatically or hydraulically operated devices. Thus the power or energy source employed in the control system may be air or other gas under pressure or water or other liquid under pressure. Such power or energy sources may be utilized to operate piston means and valves, for example, to exercise the desired control over the various devices in the system which bring about a predetermined sequence of steps desired for the performance of a cycle of stitching and work turning or other work handling steps on a succession of work pieces fed to the apparatus.

An illustrative embodiment of the invention is shown in the accompanying drawings, in which.

To simplify the disclosure of the invention and avoid unnecessary duplication of much of the disclosure of the above-mentioned pending Kosrow application, only certain of the features of the latter are shown in detail in the present case. Reference may be had to said pending application for a more complete disclosure of the mechanism which automatically operates to provide seams or lines of stitching on successive workpieces along a plurality of lines disposed at a sharp angle in relation to each other. Since the present invention is primarily concerned with means for enabling such apparatus to be quickly placed under manual control and then quickly restored to automatic control whenever desired, only so much of the automatic control apparatus is shown in the drawings of the present case as is required for an understanding of the present invention. The schematic and circuit diagram views, FIGS. 10A and 10B, serve to illustrate much of the control mechanism involved in the pending Kosrow application, together with the mechanism for converting the latter to a manual control condition and then reconverting it to an automatic control condition. Also to facilitate a full understanding of the relationship of the present invention to that of said pending application, and in the event that it is felt desirable to consider in detail some features more fully described and shown in said pending application, corresponding parts in the two cases are identified by the same reference numbers.

Figures 1, 1A:
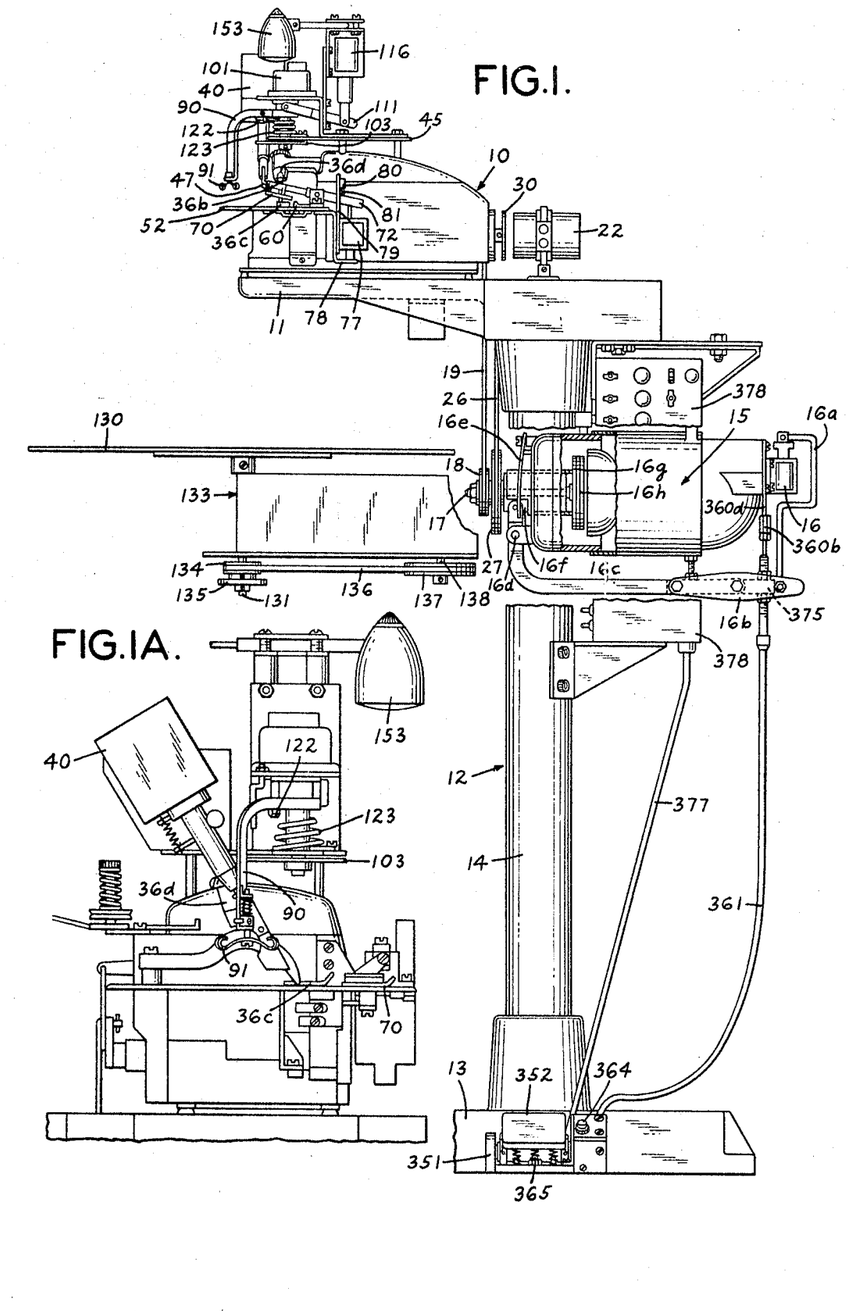
FIG. 1 is a front elevational view of the apparatus, with certain parts broken away and other parts shown in section.
FIG. 1A is an end elevational view of the upper portion of the apparatus, as seen from the left in FIG. 1.

Turning now to the drawings, there is shown in FIG. 1 a sewing machine 10 which is of the overedge sewing type of the character sold by Union Special Machine Company under the designation 39500. This sewing machine is suitably mounted on a table top 11 carried by a supporting structure generally designated as 12. The latter comprises a floor engaging base member 13 and an upwardly extending column 14 upon the upper end of which the table top 11 is mounted and suitably secured. To the underside of table top 11 there is secured a frame for supporting a combined driving motor and clutch unit 15. This unit, commonly designated a transmitter, has its clutch means adapted for engagement and disengagement both automatically and manually. For automatic engagement of the clutch to bring about driving of the sewing machine, a solenoid 16 is provided, this having its armature connected with a link 16a the lower end of which is connected with an extension 16b of a clutch operating lever 16c. The latter is pivotally mounted on a pin or stud 16d carried by an arm secured to the housing of the motor and clutch unit 15. A spring 16e normally urges the lever 16c in a counterclockwise direction about the stud 16d. The upper end of the lever 16c is pivotally connected with an element 16f the opposite end of which is connected with a clutch element 16g. The latter is normally held out of frictional engagement with a cooperating clutch element 16h but is urged into engagement with the latter upon the clockwise rocking of the lever 16c during the automatic control of the sewing apparatus. Such rocking of lever 16c to engage the clutch is accomplished by energization of the solenoid 16. During manual operation of the machine, the lever 16c is rocked by other connections with a manually operated member, such as a treadle, in the manner to be hereinafter described. The shaft 17 secured to and rotated by the clutch element 16g, when the clutch is engaged, has secured thereto a pulley 18 which is connected by a belt 19 with a pulley, not shown, secured to the main drive shaft of the sewing machine 10. Thus whenever the clutch is engaged the sewing machine will be driven.

In order to bring about quick stoppage of the sewing machine at desired times during the course of its operation, and presumably with the needle of the sewing machine in a predetermined position, such as an upper position in which it is out of engagement with the work, a needle positioning motor 20 (FIG. 10B) is provided. This motor, as more fully explained in said pending Kosrow application, is provided with a one-way driving clutch for driving a pulley in a particular direction. Said pulley, not shown, is connected by a belt 26 (FIG. 1) with a pulley 27 that is secured to the shaft 17 of the motor and clutch unit described above. Motor 20 is driven at a slower speed than the motor 15, and the pulley and belt connection 26, 27 between the two motors is such that the motor 20 has a tendency to drive the shaft 17 at a much slower rate than it is driven by the motor 15. In the normal operation of the sewing machine the main motor 15 will idly drive the armature of motor 20 which will impose little resistance to turning. However, when the needle positioning motor 20 is energized it generates a torque force strongly opposing the direction of rotation of the drive shaft of the motor 15. Due to the one-way clutch connection between the armature of motor 20 and the pulley driven thereby, the motor 20 will not drive the motor 15 in the opposite direction from that in which it is driven upon the delivery of current thereto, but it does apply a substantial torque force tending to resist the rotation of the shaft 17 of the motor and clutch unit 15. This brings about quick stoppage of the driven clutch element and the connected sewing machine when the needle positioning motor 20 is energized. In the event that it is desired to stop the sewing machine with the needle either in an up position or a down position, the activation of the motor 20 is contingent upon the control of a photoelectric sensor 22. The latter is responsive to light reflected from a radially extending narrow surface on a disc 30 secured to the main shaft of the sewing machine 10. It is when this light reflecting surface directs light against photoelectric switch means within the sensor 22 that the motor 20 is connected with its electrical source of power in a way tending to drive the motor 20 in the reverse direction, by the energizing of relay 325. As explained in the pending Kosrow application, the motor 20 will have previously received current for driving it in the forward direction through the operation of relay 290 by current from capacitor 255. This will have slowed down the operation of the sewing machine from say 8,000 r.p.m. to 1,200 r.p.m. By properly locating the position of the light reflecting surface on the disc 30, the main shaft of the sewing machine may be stopped in a position in which the needle is either up or down, whichever may be desired under the particular circumstances.

There are various devices in the sewing apparatus which must be operated from time to time in performing the desired seaming. Some of these devices must be operated both when the machine is under automatic control and when the machine is under manual control.

Other of such devices require operation only during the automatic control of the machine. The automatic operation of all such devices must be discontinued when the machine is converted from automatic to manual control, and must be restored when the apparatus is returned from manual to automatic control.

Figure 10A:
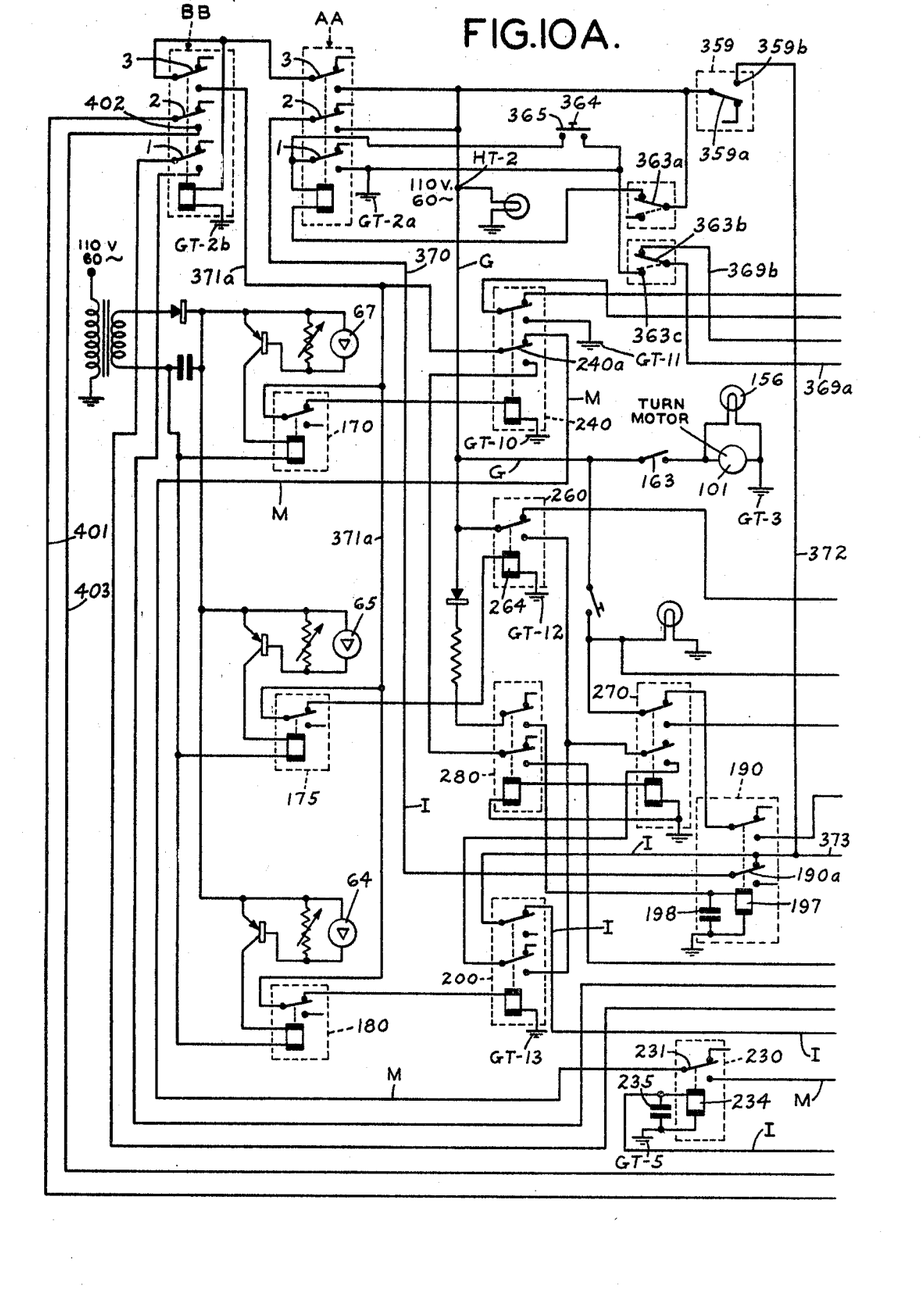
FIGS. 10A and 10B are schematic views which, when placed with FIG. 10B to the right of FIG. 10A, illustrate the circuitry involved in the present invention for controlling various devices in the apparatus both automatically and manually.
Figure 10B:
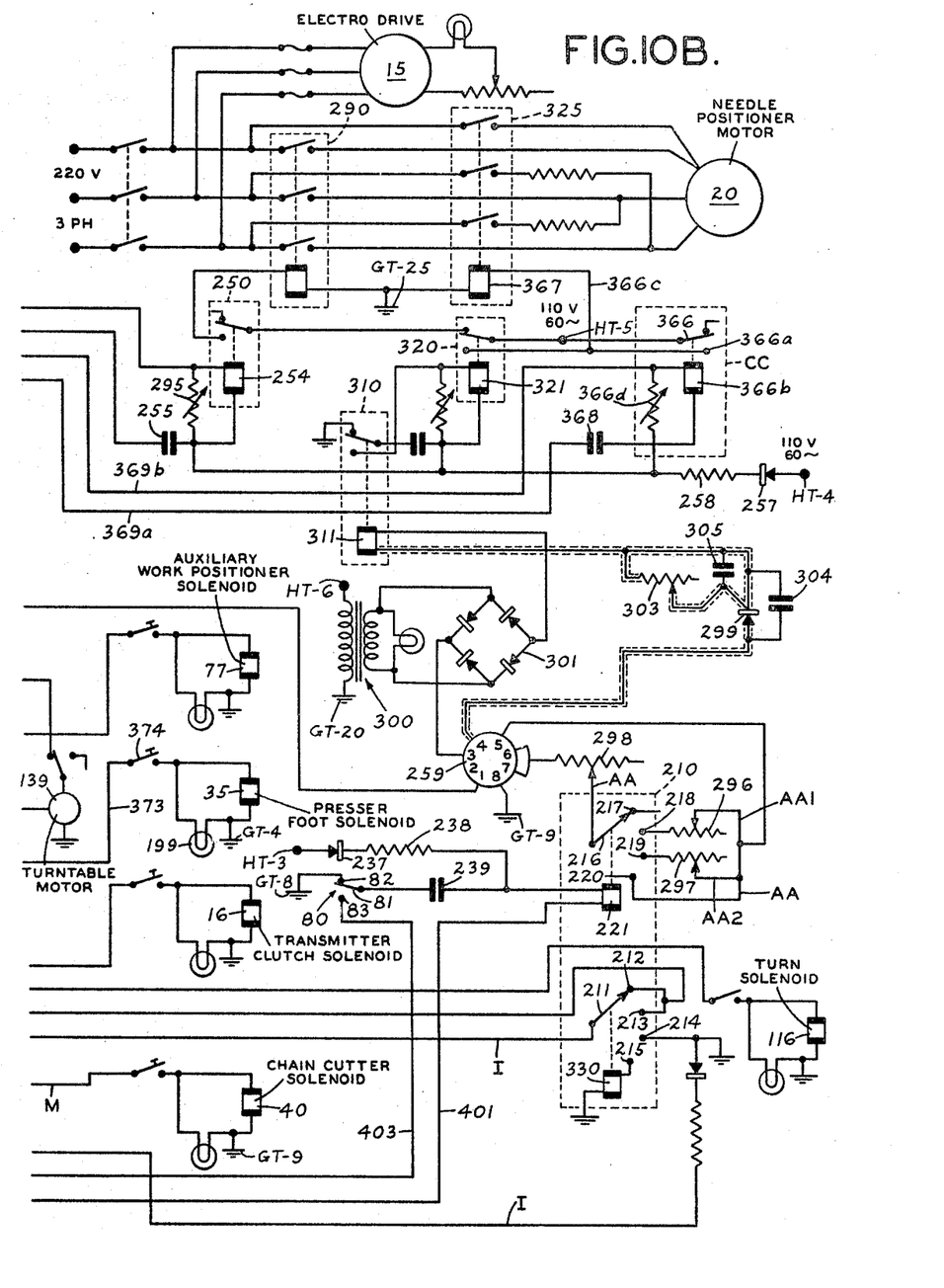

A device which must be capable of both automatic and manual control is a presser foot 36c (FIG. 1) which is carried by an arm 36b that is normally urged downwardly to engage the presser foot with the work and the work supporting table by a spring mounted within a housing 36d. As shown in FIG. 10B, the automatic lifting of the presser foot is effected by energizing a solenoid 35. Conventional manual means of the character provided in the above-mentioned type 39500 machines will be provided for effecting the manual lifting of the presser foot whenever desired during the manual control of the machine.

Figure 1B:
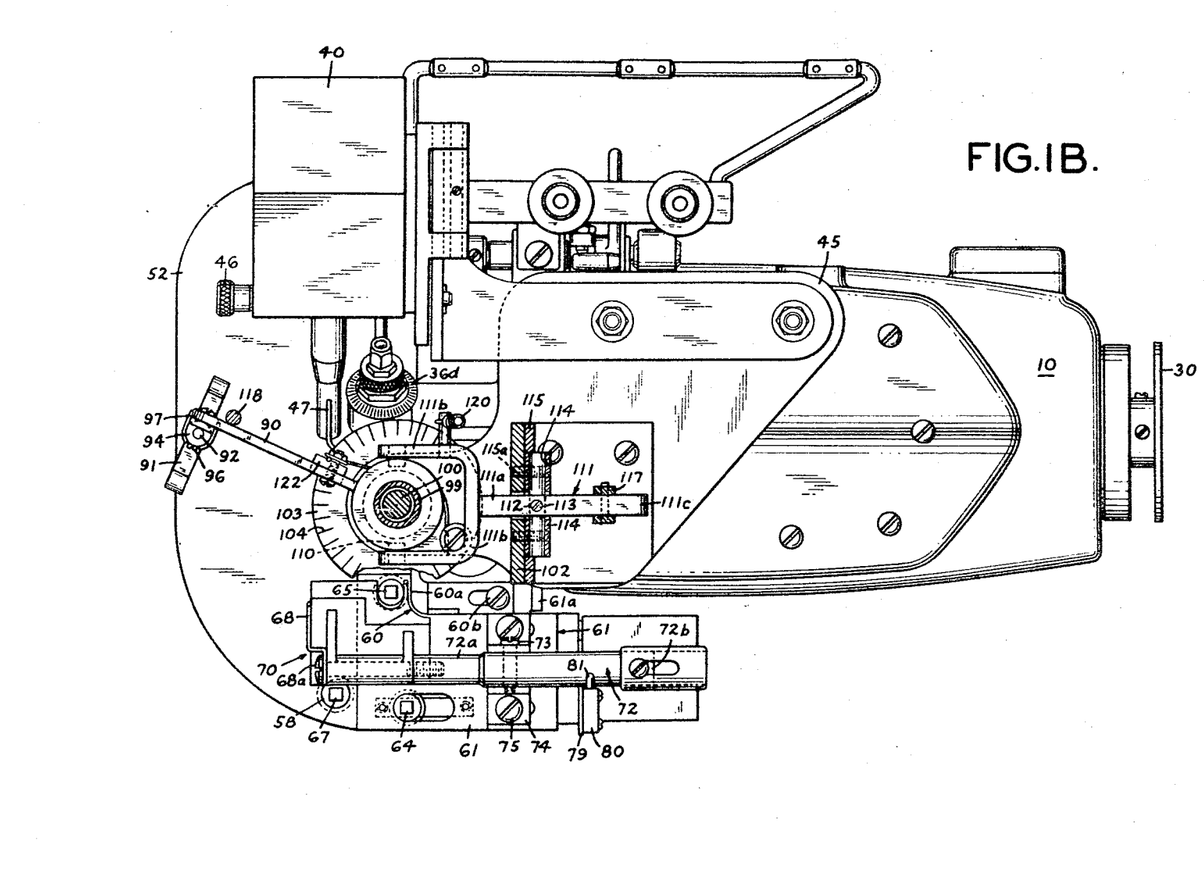
FIG. 1B is a top plan view of the apparatus, with certain parts broken away and shown in horizontal section.

A device incorporated in the machine, which is operated only during automatic control, is a thread chain cutter indicated at 47 in FIGS. 1A and 1B. This is adapted to be moved downwardly to cut the thread chain at the completion of a series of lines of stitching by the operation of a solenoid 40. This, as explained in detail in the pending Kosrow application, and as shown schematically in FIGS. 10A and 10B of the present application, is operated under automatic control at the appropriate time in a cycle of operation of the apparataus.

The sewing apparatus herein disclosed is provided with a work support or cloth plate 52, shown in FIG. 1B, upon which workpieces are successively placed in line with the stitch forming devices and work feeding devices of the sewing machine. As explained in the above-mentioned pending Kosrow application, this cloth plate or work support member is preferably narrow in the direction transverse to the line of stitch formation but is relatively long in the direction parallel with the line of stitch formation. Also its left hand edges (FIG. 1B) are preferably curved at the forward and rearward ends of the member. This facilitates the automatic control over the proper movement of the successive workpieces in the course of operation of the apparatus, in the manner disclosed in said pending application. At its forward end the cloth plate 52 is narrower than at its rearward end, but it is supplemented at its forward end by a cloth plate 61, as shown in FIG. 1B. This supplemental cloth plate has its top surface in the same plane as that of member 52 and it is provided with various openings through which light may be passed from a light source 153 (FIG. 1) above the machine to light responsive devices beneath the main and auxiliary cloth plates. Applied to the upper surface of the cloth plate 61, in a region just in advance of the zone of stitch formation, is a work guiding element 60 having an upwardly extending portion 60a adapted to cooperate with the right hand edges of successive workpieces as they are fed to and through the machine. A screw 60b cooperating with an elongated opening in the member 60 enables lateral adjustment of the latter to position the work guiding portion 60a in the desired location in relation to the stitch forming devices.

Within openings provided in the main and auxiliary cloth plates 52 and 61, there are positioned three light responsive elements 64, 65 and 67. These are responsive to a beam of light directed toward the same from source 153 (FIGS. 1 and 1A). The openings through the cloth plates communicating with the light responsive devices are covered by the workpieces at certain times during the operation of the machine, and are exposed at other times during the operation of the machine. This enables them to exercise a control over the operation of various devices in the course of automatic control of the machine. This is fully explained in the pending Kosrow application referred to above.

To insure proper automatic control over the advance of the successive workpieces into and through the stitch forming zone, an auxiliary positioning device 70 is provided and arranged to engage the upper surface of successive workpieces at particular times during the operation of the apparatus under automatic control. Member 70 is carried by a rockable member 72 which serves to shift the member 70 into and out of engagement with the work at selected times during the operation of the apparatus. Member 72 is rockable about a screw stud 73 (FIG. 1B) under control of a solenoid 77 (FIG. 1). The latter is energized at desired times during the automatic operation of the apparatus. As shown in FIG. 1 the solenoid 77 is mounted on a bracket 78 which is secured to the frame of the sewing machine. Another strip-shaped bracket 79 is secured to the bracket 78 and carries adjacent its upper end a microswitch 80. Upon operation of the solenoid 77, and the consequent rocking of the member 72, the arm 81 of the microswitch 80 will be operated to shift from the grounded contact 82 to contact 83 (FIG. 10B). When the microswitch 80 has its arm 81 engaged with contact 82, as shown in FIG. 10B, current from source HT–3 will pass through rectifier 237, resistor 238, capacitor 239 and switch 80 to ground at GT–8. This will serve to charge the capacitor 239. Then, when the switch arm 81 is forced into engagement with contact 83, as above described, current will be discharged from the capacitor through solenoid 221 of relay 210 and through line 401 to switch arm 2 of relay BB, FIG. 10A. When the machine is under automatic control, the relay BB will be energized, in the manner to be explained, so that arm 2 will be carried down into engagement with contact 402 thereby completing a circuit through line 403 back to contact 83. Thus the solenoid 221 will be energized during the time it takes to discharge the capacitor 239. Energizing of solenoid 221 serves to shift the switch arms 211 and 216 in a clockwise direction one step from the particular contact in relay 210 with which they were engaged at the time. This, as explained in the pending Kosrow application, serves to energize a turn solenoid 116 having its armature connected with a rock lever 111 which has its opposite end connected with the arm 90 (FIGS. 1, 1A and 1B), thereby causing the latter and its connected parts to be lowered to engage the element 91 at the lower end of arm 90 with the work on the cloth plate 52. At the same time a member 122 (FIG. 1B) carried by arm 90 and having a relatively sharp edge at its lower end will be carried into engagement with one of the slots 104 in a turn member 103. The latter, as explained in the pending Kosrow application, is constantly rotated in a clockwise direction (FIG. 1B) so long as the automatic control of the apparatus is functioning. It is driven by a turn motor 101 (FIGS. 1 and 10A). The circuit to the turn motor, as shown in FIG. 10A, extends from the current source HT–2 through a line G and a normally closed switch 163 to the turn motor and then to ground at GT–3. In parallel with the turn motor is a light 156 which indicates to the operator that the turn motor circuit is completed. The turn solenoid 116 will remain energized until the workpiece has been turned by member 91 through a sufficient angle to line up the next edge of the workpiece to be sewn with the stitch forming devices in the direction of feed. This, as explained in the pending Kosrow application, is determined by the turning of the workpiece to such an extent that the new edge to be stitched is carried to a point where the work successively covers all of the light responsive elements 67, 65 and 64 in that sequence. This causes deactivation of relays 170, 175 and 180, thereby bringing about reactivation of relays 240, 260 and 200, as explained in the above-mentioned pending Kosrow application.

Upon de-energization of the solenoid 116 a spring 120 (FIG. 1B) will rock the lever 111 in a clockwise direction (FIG. 1) to lift the arm 90 and disengage element 122 from the disc 103. This causes a torsion spring 123 to return the arm 90 in a clockwise direction (FIG. 1B)

into its normal position in engagement with a stop pin 118. The machine is now ready for stitching along the next edge of the work which has been aligned with the stitch forming mechanism in the direction of the feed. Upon completion of the next line of stitching, the work turning mechanism will be brought into play to present another edge of the work to be stitched in alignment with the stitch forming mechanism in the direction of feed. The number of automatic turnings of the work will be determined by the timer 259 and the relay 210 in the manner explained in the pending Kosrow application above-mentioned. As illustrated in the drawings (see FIG. 10B), each workpiece will be subjected to two automatic turnings and to stitching along three edges. Upon completion of the stitching of the third or last edge of a workpiece a circuit will be completed through a chain cutter solenoid 40 in the manner explained in said pending Kosrow application. This will bring about the operation of the cutter 47 to cut the thread chain just beyond the end of the last line of stitching, after a suitable length of thread chain has been formed.

As explained in the pending Kosrow application, the desired control over the movement of the workpieces in the course of the stitching operations, and the proper action of the thread chain cutter 47, is facilitated by the provision of a rotating table 130, designated a turntable. This is suitably journaled at the outer end of a bracket 133 secured to column 14 of the supporting structure of the apparatus. The shaft 131, which carries the turntable 130 at its upper end, has a pulley 134 secured thereto, this being driven by a belt 136 the opposite end of which cooperates with a pulley 137 secured to a downwardly extending shaft 138 of a special motor 139 (FIG. 10B) provided for driving the turntable. The arrangement is such that the turntable is rotated in a counterclockwise direction so that it tends to draw toward the left any portion of the workpiece that has passed through the stitch forming zone and has dropped downwardly over the rear, curved edge of the work support 52. This insures drawing the free thread chain at the trailing end of a workpiece toward the left into proper position for severance by the cutter 47.

Figure 11:
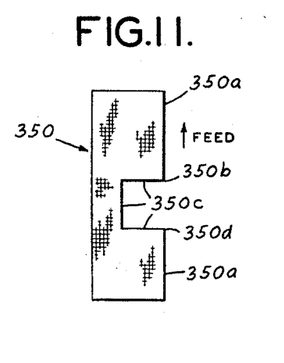
FIG. 11 is a plan view of a representative work piece adapted to be advanced through the sewing apparatus for the performance of certain seaming operations under automatic control and other seaming operations under manual control.

Referring now to FIG. 11, there is illustrated a workpiece 350 having one edge 350a disposed in the direction of feed and in alignment with the stitch forming mechanism. When the stitching has been carried to the point 350b, the operator, by use of the mechanism now to be described, may interrupt the automatic control over the operation of the apparatus and bring about the manual control over the stitching of the three edges 350c, which may of course be of any configuration and may, if desired, be only two edges of a triangle or a single edge of a suitable curvature. Then, when the point 350d is reached, the operator may arrest the operation of the machine under manual control and may turn the edge 350a into proper alignment with the stitch forming mechanism, and the control over the sewing and turning of the workpiece may then be restored to the automatic arrangement described above and more fully explained in the pending Kosrow application.

Figure 2:
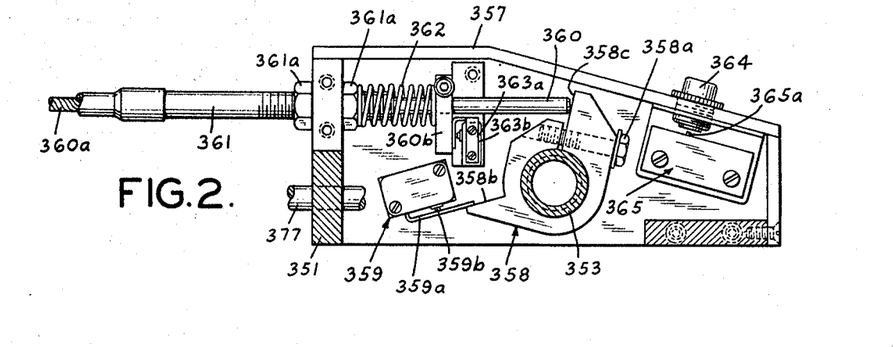
FIG. 2 is a vertical sectional view through a treadle member incorporated in the apparatus for converting it from automatic to manual control and vice versa.
Figure 3:
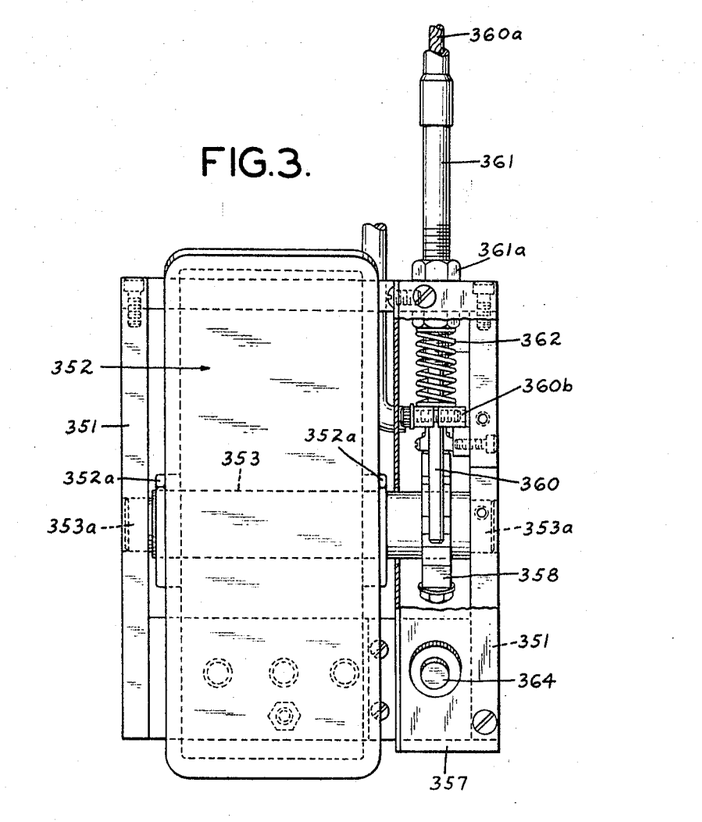
FIG. 3 is a plan view of the treadle member, with portions broken away and shown in section.
Figure 4:
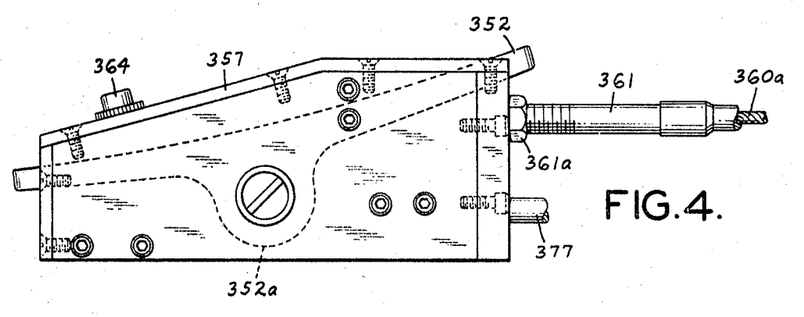
FIG. 4 is a side elevational view of the treadle member as seen from the right in FIG. 3.
Figure 5:
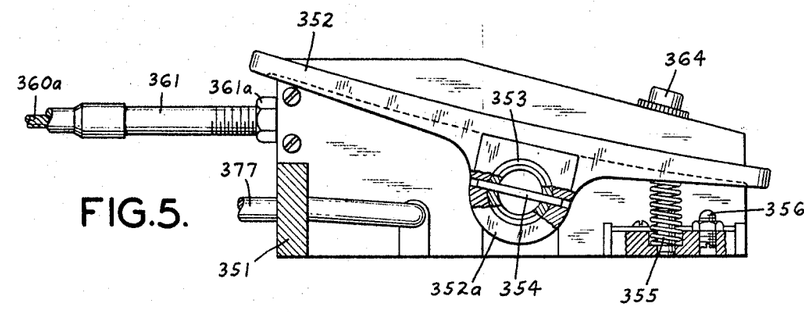
FIG. 5 is a view of the treadle member, partly in elevation, as seen from the left in FIG. 3, and partly in vertical section.
Figure 6:
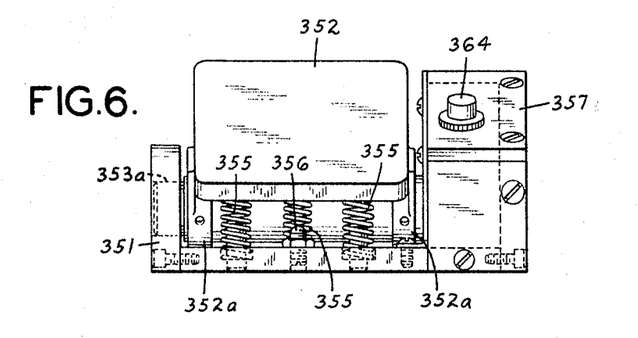
FIG. 6 is a front elevational view of the treadle member.

Turning now to the means for enabling manual control over the operation of the sewing machine, this includes a foot treadle unit disclosed in detail in FIGS. 2–6 of the drawings. It has a supporting structure 351 which is adapted to be placed on the floor adjacent the forward side of the sewing apparatus so as to enable the operator to readily rock the treadle in the various directions and to the various extents to be described. If desired, this supporting structure could be attached to the base 13 of the support for the sewing apparatus, but this is not necessary. The treadle element is designated 352 and, as shown in FIG. 5, is inclined upwardly toward the left. This is in the direction in which the operator faces. The upper portion of the treadle may be engaged by the toe of the operator, to rock the treadle in a counterclockwise direction, while the lower right end of the treadle may be engaged by the heel of the operator to rock the treadle in a clockwise direction. The treadle is secured to a hollow shaft 353 by means of one or more pins 354. These pins pass through downwardly extending ears 352a provided on the treadle to surround the shaft 353. The two ends of shaft 353 are of slightly reduced diameter, as indicated at 353a, and these portions are in bearing engagement with vertically extending portions of the supporting structure 351. A part of this structure is enclosed to provide a housing 357 (FIG. 3) which encloses certain devices to be described. A plurality of springs 355 tend to urge the treadle member 352 in a counterclockwise direction but only to a predetermined extent as shown in FIG. 5. As will be later explained, another spring tends to urge the treadle in the opposite direction. When the treadle is heeled by the operator it will compress the springs 355, and there is preferably provided a stop screw 356 for engagement with the under surface of the treadle to prevent undue rocking of the latter in the heeling direction. Secured to the shaft 353 within the housing 357 is a member 358. As shown in FIG. 2, this member is split at its upper end to enable it to be clamped in a desired set position on the shaft 353 by means of a bolt 358a. A microswitch 359 is provided in the housing 357 and this carries a spring element 359a which cooperates with a shoulder 358b on the member 358. Spring element 359a is adapted to engage a push-button 359b to operate the switch. Such operation takes place when the treadle is heeled by the operator. Another shoulder 358c on the element 358 engages a rod 360 which forms a part of or is connected with a flexible, Bowden cable 360a which is a core surrounded by and relatively movable within a sheath member 361. The sheath 361 is secured in fixed relation to the housing 357 by means of threaded nuts 361a. Secured to the rod 360, which is connected with the core 360a, is a member 360b which is urged by a spring 362 toward the right in FIG. 2. When the treadle is toed by the operator, the rod 360 will be urged toward the left within the sheath 361 and the element 360b will be moved away from a pair of microswitches 363a and 363b. Normally these switches are in the position shown in FIG. 10A, when the element 360b is in the position shown in FIG. 2. However, when the treadle is toed these switches will shift under the force of an internal spring, into the positions indicated in broken lines in FIG. 10A. On the inclined upper surface of the housing 357 there is mounted a push-button 364 adapted to be operated by the foot of the operator. When it is so operated inwardly, it will engage an actuating pin 365a of another microswitch 365 mounted within the housing 357. The purpose of each of the four microswitches above-mentioned, that are mounted within the housing 357, will be hereinafter described.

It appears desirable at this time to refer briefly to the differences between the circuitry involved in the instant invention as compared with that disclosed in the above-mentioned Kosrow application. In general, the circuitry in the present case, shown in FIGS. 10A and 10B placed side by side, differs from the circuitry of the pending application, as shown in FIG. 16 thereof, primarily by virtue of the inclusion in the present case of relays AA, BB and CC. The switches 363a and 363b, referred to above as being present in the treadle unit, are normally in the position shown in FIG. 10A when the foot treadle is not operated, and they remain in that position upon heeling of the foot treadle, but are shifted downwardly into their lower positions upon toeing of the foot treadle. When the apparatus is put into operation, the button 364 mentioned above will be depressed by the operator for an instant to close the switch 365. This serves to complete a circuit through the solenoid of relay AA by a circuit extending from terminal HT-2 upwardly, then toward the right and then downwardly to the switch 363a from which it extends to the solenoid mentioned, the opposite end of which is connected through switch 365 to ground at GT–2a. Once the circuit has been completed, the arms of relay AA will be swung downwardly into engagement with the lower contacts shown. Such downward swinging of arm 1 of the relay will retain the circuit through the solenoid in active condition, since it connects the solenoid with terminal GT–2a. So long as switch arm 363a is in its active position, the energizing or relay AA will close a circuit through the solenoid of relay BB. This extends from terminal HT–2 through arm 3 of relay AA over to the solenoid of relay BB and down to ground at GT–2b. This will cause all of the arms 1, 2 and 3 of relay BB to swing downwardly into engagement with the contacts shown below them. As previously indicated, the arm 2 thus brought into engagement with contact 402a helps to complete the circuit through lines 401 and 403 in the manner explained.

Relay CC when energized to pull its arm 366 downwardly into engagement with contact 366a will complete a circuit from source HT–5 through line 366c to solenoid 367 and then to ground at GT–25. This serves to reverse the current delivered to the motor 20 and thus brings about quick stopping of the machine.

The solenoid of relay CC may be energized in the following manner. Current from source HT–4 passing through rectifier 257 and resistor 258 passes through a capacitor 368 and from there over to the arm of the switch 363b described above. Arm 363b will at this time be in its lower position in engagement with contact 363c so that the circuit is completed to ground at GT–2a. This will result in charging the capacitor 368. Now when the arm 363b is shifted upwardly into the full line position shown in FIG. 10A, a circuit will be completed from capacitor 368 through lines 369a and 369b over to the solenoid 366b of relay CC. The lower end of this solenoid is connected to the opposite side of the capacitor 368. In order to control the time required to discharge the capacitor 368 through the circuit mentioned, there is provided a variable resistor 366d in parallel with the solenoid 366b. It will be understood that the operation of the switch arm 363b to bring about the foregoing result is due to a toeing action by the operator on the foot treadle and then a release of the treadle.

In connection with the above let it be assumed that the operator starts the apparatus for automatically serging along the line 350a (FIG. 11). As the stitching approaches the point 350b, the operator slightly taps the treadle in toe direction to actuate the switches 363a and 363b. Such operation of switch arm 363a will open the circuit extending through the solenoid of relay AA. Accordingly, the contacts 1, 2 and 3 of the latter are moved to their inactive positions. The opening of contact 1 interrupts the circuit through the solenoid of relay AA at a point in addition to that at which arm 363a interrupts such circuit. Accordingly the circuit will remain open, even if arm 363a is returned to its normal position. The opening of contact 2 of relay AA interrupts a supply of current from HT–2 through a line 370 extending downwardly and over to the right to arm 190a of relay 190. Also the opening of contact 3 of relay AA interrupts the current delivery line from HT–2 to the solenoid of relay BB, thus de-energizing that relay. This further results in the interruption of a circuit from arm 3 of relay BB extending downwardly along a line 371a, and thus brings about interruption of the supply of current to the relays 240, 260, 270, 280, 190 and 200 of the automatic control circuitry. In addition the de-energization of solenoid BB will interrupt the circuit extending to the turn solenoid 116. This serves to guard against a possible energization of the turn solenoid during the manual control of the machine.

It should be noted that the deactivation of relay BB serves a number of purposes in insuring that the automatic control system of the apparatus will not intervene during the intended manual control of the apparatus. Thus, the opening of contact 2 of relay BB constitutes a safety measure against the energization of the stepper relay 210. The circuit which would normally bring about such stepping action is definitely interrupted by the switch arm 2 being in its upper, inactive position shown in FIG. 10A. This is important to the achievement of the objective stated above of having the apparatus resume its automatic operation whenever desired at the point in a cycle at which it was interrupted. It insures completion of that cycle after special stitching operations of the type described in relation to FIG. 11 have been carried out. This may be characterized as a "phase memory component" of the auxiliary circuitry. The opening of contact 3 of relay BB provides a second interruption in the current supply line extending to and through the various relays 190, 200, 240, 260, 270 and 280.

Returning to the slight forward rocking of the treadle by the operator, it will be noted that this not only disengages switch arm 363a from the active contact, thereby opening the circuit through the solenoid of relay AA, but it also serves to swing the arm 363b down into engagement with contact 363c. This serves to interrupt the circuit by which the capacitor 368 is adapted to discharge its stored electrical energy through the solenoid of relay CC. In fact, upon movement of the switch arm 363b into engagement with contact 363c a circuit is completed from source HT–4 through capacitor 368 and line 369a to ground terminal GT–2a. This will serve to build up the storage of current in the capacitor 368 which will later enable the manual control over the delivery of the current to the solenoid 367 for providing the stopping action of the motor 20. In order to bring the sewing machine to a full stop, the operator must return the treadle to its neutral position. This will again restore the switches 363a and 363b to the position indicated in FIG. 10A. Restoring of switch 363b to the position there shown will complete a circuit from the capacitor 368 to and through the solenoid 366b, thereby bringing about the quick stoppage of the sewing machine. It should be stated in this connection that, while the delivery of current to the needle positioning motor 20 under these circumstances tends to drive the same in the reverse direction from that in which it is being driven by the sewing machine, it will not actually be turned in such reverse direction because of the one-way clutch drive hereinabove described. The energizing of motor 20 does, however, bring the sewing machine to a very quick stop as more fully explained in the pending Kosrow application.

In the course of producing a series of lines of seaming at an angle to each other under manual control, as suggested in relation to the stitched edges 350c in FIG. 11, the machine may be briefly stopped several times to enable the operator to turn the work through the desired angles. It will be appreciated that as the machine is being driven under manual control the treadle will be rocked forwardly, i.e. counterclockwise in FIG. 5, to cause engagement of the clutch by the action of the sheath 361 of the cable. This causes swinging of the switch arm 363b into engagement with contact 363c, thereby closing the circuit from HT–4 to terminal GT–2a and thus storing electrical energy in capacitor 368. Then when the treadle is permitted to return to its normal position, the stored energy in the capacitor will flow through the circuit passing through the solenoid 366b, thereby energizing solenoid 367 of relay 325 and causing quick stoppage of the machine. Such manual starting and stopping of the machine may take place as often as required to complete the lines of stitching 350c. After completion of the line of stitching out to the point 350d in FIG. 11, and the manual turning of the workpiece to re-align the edge 350a with the line of feed, the apparatus will be returned to automatic control by operation of the push-button 364 to operate switch 365 and thereby reactivate the relays AA and BB.

When it becomes desirable for the operator to raise the presser foot during the manual or automatic control phase, all that needs to be done is to heel the treadle, thus causing operation of the switch 359 by the action of the shoulder 358b on element 358. This will result in completing a circuit to the presser foot solenoid 35 (FIG. 10B). This circuit will be completed from terminal HT-2 to the switch 359 whose arm 359a will be rocked upwardly into engagement with the contact 359b. From there the circuit continues through line 372 down to line 373, and from the latter toward the right over to the normally closed switch 374 to the solenoid 35 and then to ground at GT-4. In parallel with the circuit through solenoid 35 is a branch circuit carrying a light 199 to indicate to the operator whenever the presser foot is lifted from the work. It will be understood that in the course of completing the last line of stitching on the workpiece in the automatic control of the apparatus, the sewing machine will be continued in operation for a few stitches to form a free thread chain that is then severed by the cutter 47 in the manner previously explained. Briefly, the circuit for energizing the chain cutter solenoid 40 is that designated M which extends from terminal HT-2 upwardly and then toward the left to arm 3 of the then activated relay AA. From here it extends to arm 3 of the still activated relay BB, and then via line 371a over to arm 240a of the de-energized relay 240. From this point the circuit extends along the line designated M downwardly and toward the left and then downwardly and toward the right in FIG. 10A over to the switch arm 231 of relay 230. At first the arm 231 will be in the inactive position shown in FIG. 10A, but it will be drawn downwardly at the appropriate time to complete the circuit M over to and through the chain cutter solenoid 40. Energization of relay 230 to bring about the swinging of the arm 231 downwardly to complete circuit M is achieved through circuit I which is completed from terminal HT-2 to terminal GT-5 when the arm 211 of relay 210 is engaged with contact 214. This occurs upon the completion of the third line of stitching in the illustrative embodiment of the invention. Closing of circuit I in this manner first serves to charge the capacitor 235 and then to activate solenoid 234. This allows time for the provision of a suitable number of stitches in a free thread chain, and to allow the workpiece to drop from the left side of the cloth plate 52. Consequently, the free thread chain is drawn toward the left across the path of movement of the cutter knife 47.

Figures 7, 8:
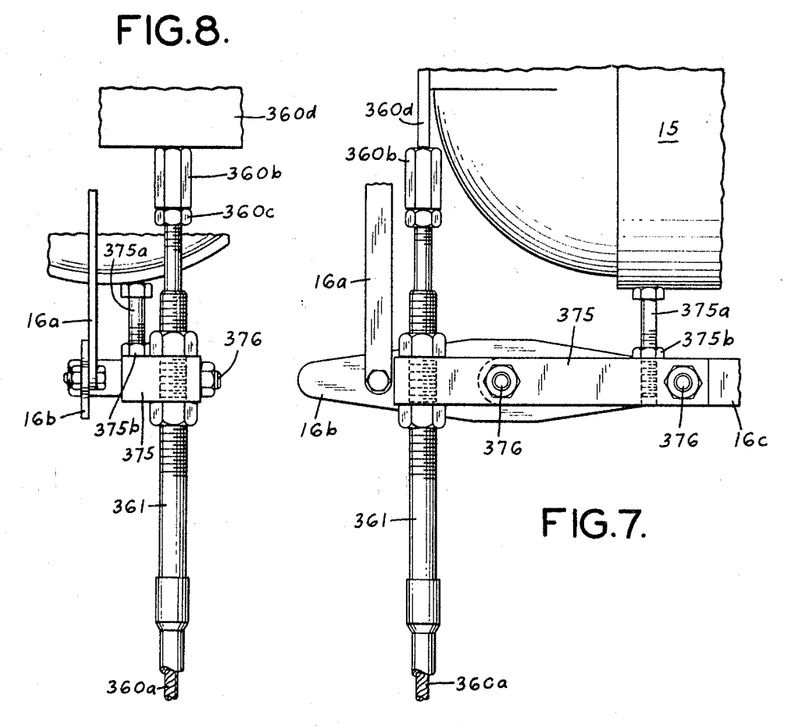
FIG. 7 is a detail view showing a part of the motor for driving the sewing machine and certain connections from both the automatic and the manual control means for operating the clutch mechanism.
FIG. 8 is a detail view, in elevation, of a portion of the mechanism shown in FIG. 7, as seen from the left in FIG. 7.
Figure 9:
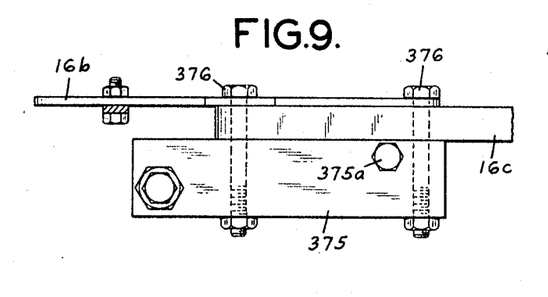
FIG. 9 is a detail view, partly in plan and partly in horizontal section, showing a portion of the elements for controlling the operation of the transmitter clutch.

Whenever the machine is under manual control the clutch, for bringing about the operation of the sewing machine and for then stopping its operation by disengagement of the clutch, is actuated by sheath 361 which surrounds the flexible cable 360a. As has been explained, the sheath 361 is firmly secured to the frame structure 357 by the nut elements 361a. At its opposite end the sheath is connected with a member 375 (FIGS. 7-9) which is connected by bolts 376 to the plate 16b that is connected with the lever 16c for operating the clutch in the manner described in relation to the automatic control. During manual operation the operator will rock the treadle 352 by a toeing action to cause the element 358 (FIG. 2) to push the rod 360 and its connected core element 360a into and longitudinally of the sheath 361. However, the core element carries at its upper end a threaded block element 360b which is firmly held in place on the upper end of the threaded core element 360a by a lock nut 360c. Block element 360b engages the under surface of a plate 360d secured to the frame of the transmitter unit 15. By virtue of this, it will be seen that the upper end of the core 360a will be held stationary. A bolt 375a, in threaded connection with member 375 and locked in place by a nut 375b, has its head arranged to engage the under surface of the frame of the transmitter to limit the counterclockwise movement of the clutch actuating lever 16c (FIG. 1).

It will be apparent that the holding of the upper end of the core 360a stationary, as the lower end is pushed into the sheath, will cause the sheath to bulge outwardly, and because its lower end is fixed to the frame 367 and its upper end is fixed to the clutch operating lever, the latter will be rocked in a clockwise direction (FIG. 1) to bring about the engagement of the clutch.

As best shown in FIG. 1 the treadle unit 351 is connected by an electrical cable 377 with a switch box 378. The latter is similar to the switch box 150 of the pending Kosrow application but carries the modified circuitry, including relays AA, BB and CC, with the interconnected wiring shown schematically in FIGS. 10A and 10B.

It will be understood that various modifications of the apparatus and the control systems embodied therein may be made within the scope of the claims which are to follow. It is believed clear that an important aspect of the present invention is the provision of a sewing apparatus incorporating automatic control means for governing the operation of the stitch forming and work handling members of the apparatus, with the ability to interrupt the automatic control whenever desired to enable manual control of the stitch forming devices, and the manual turning and positioning of the succesive workpieces dealt with by the apparatus. It should be understood that the term "manually operable means" and any similar term that may be used in the foregoing specification and in the claims are to be construed as embracing means operated by the foot, knee or hand of the operator of the machine.

What is claimed is:

1. Sewing apparatus comprising a sewing machine having stitch forming mechanism, a motor and clutch unit for driving said sewing machine, a work supporting member arranged to support a workpiece in the region of said stitch-forming mechanism, means for retaining a workpiece against said work supporting member, means for shifting said retaining means into and out of active position, means adapted to turn a workpiece through an angle upon completion of a predetermined line of stitching, automatic means for controlling and effecting the operation of said workpiece retaining means, the driving of said sewing machine and the operation of said workpiece turning means in a predetermined sequence of steps to produce on said workpiece a plurality of lines of stitching of desired length and at a desired angle in relation to each other, manually operable means for interrupting the action of said automatic means at any desired time in a cycle of operation of the apparatus and for enabling manual control over the stitching and handling of the workpiece, and another manually operable means for restoring the automatic control over the operation of said machine and said workpiece retaining and turning means.

2. Sewing apparatus as set forth in claim 1 in which said manually operable means for restoring the automatic control over the operation of said machine and said retaining and turning means serves to cause completion of the sequence of steps that was being carried out at the time of interruption of said automatic control.

3. In sewing apparatus as set forth in claim 1, electrical means for controlling the operation of said motor and clutch unit, said work retaining means and said means for turning a workpiece through an angle.

4. In sewing apparatus as set forth in claim 3, a plurality of circuits arranged to control the operation of said motor and clutch unit and said work retaining and turning means, and means for rendering certain of said circuits inactive upon operation of said manually operable means for interrupting the action of said automatic means.

5. Sewing apparatus as set forth in claim 1 in which said means for retaining a workpiece against said work supporting member comprises a plurality of spaced members, and separate means being provided for shifting said members into and out of active position.

6. In sewing apparatus as set forth in claim 1, a thread chain cutter, and automatic means for controlling and effecting the operation of said cutter.

7. In sewing apparatus as set forth in claim 3, said electrical means including a solenoid automatically controlled for causing engagement of the clutch to drive the sewing machine, and manual means for causing engagement of said clutch whenever manual control of said sewing apparatus is desired.

8. In sewing apparatus as set forth in claim 1, a needle positioning motor connected with the sewing machine, and means for energizing said motor automatically to stop said sewing machine with the needle in a desired position.

9. In sewing apparatus as set forth in claim 8, manually operable means for energizing said needle positioning motor to apply a braking action to the sewing machine at the will of the operator.

10. Sewing apparatus as set forth in claim 1 comprising means for predetermining the number of turning movements to be applied to each of a plurality of workpieces in carrying out the automatic sequence of steps desired.

11. Sewing apparatus as set forth in claim 10 comprising automatic means for insuring the production of a number of free thread chains at the trailing end of the work after seaming the edge of the same presented upon the last turning movement applied thereto.

12. In sewing apparatus as set forth in claim 10, said manually operable means for interrupting and restoring the automatic control over the operation of the machine being capable of operation at any time in the course of operation of the machine.

13. In sewing apparatus as set forth in claim 1, said automatic means comprising light source means and means responsive to light for controlling the operation of at least one of said means the operation of which is automatically controlled and effected.

14. In sewing apparatus as set forth in claim 13, said light source means and said means responsive to light being arranged to control the extent of turning imparted to the workpiece upon completion of stitching along one edge thereof and prior to the commencement of stitching along another edge thereof.

15. In sewing apparatus as set forth in claim 1, said automatic means comprising means for projecting a control medium along a plurality of predetermined paths, a plurality of means in said paths of the control medium so projected and responsive to the receipt thereof, and connections from said last mentioned means for controlling the extent of turning movements imparted to the workpieces.

16. In sewing apparatus as set forth in claim 1, said manually operable means for controlling the stitching of a workpiece comprising a rockable treadle and a lever for controlling the operation of the sewing machine, a flexible sheath and internal cable extending from said treadle to said lever, said sheath having the end thereof adjacent said treadle retained in a fixed position and the other end thereof fixedly connected with said lever, said cable having its end adjacent said lever restrained against movement and its opposite end adapted for movement by said treadle upon the operation of the latter.

17. In sewing apparatus as set forth in claim 1, said manually operable means for interrupting the action of said automatic means comprising a treadle, energy delivering means for causing the operation of said automatic means, means controlled by a predetermined operation of said treadle for interrupting the delivery of energy to certain of said automatic means.

18. In sewing apparatus as set forth in claim 5, a plurality of said work retaining means being shifted into active position during automatic control of the apparatus, and only one of said work retaining means being shifted into active position during manual control of the apparatus.

19. In sewing apparatus as set forth in claim 1, a control unit incorporating said first mentioned manually operable means, said means comprising a rockable member normally retained in a predetermined position, means operated by said rockable member when the latter is rocked in one direction serving to interrupt the action of said automatic means.

20. In sewing apparatus as set forth in claim 19, connections from said rockable member when rocked in said one direction adapted to operate the clutch of said motor and clutch unit to cause driving of the sewing machine under manual control.

21. In sewing apparatus as set forth in claim 20, means controlled by said rockable member when it is returned to its normal position for quickly stopping said sewing machine.

22. In sewing apparatus as set forth in claim 21, means operated by said rockable member when rocked in the opposite direction for lifting said work retaining means away from the work.

23. In sewing apparatus as set forth in claim 19, said control unit carrying said other manually operable means adapted to restore the automatic control over the operation of the machine.

24. In sewing apparatus as set forth in claim 23, the means for effecting said automatic control over the operation of the machine including a plurality of relays, certain of said relays being energized by the operation of said other manually operable means.

25. In sewing apparatus as set forth in claim 24, additional relays included in said means for effecting said automatic control, means for projecting a control medium along a plurality of predetermined paths, a plurality of means responsive to said control medium disposed in said paths for the receipt of said medium and thereby controlling the activation of certain of said additional relays, means whereby the workpieces being stitched are advanced across said paths and serve to prevent activation of certain of said relays and to effect activation of others.

26. Sewing apparatus comprising a sewing machine having stitch forming and work feeding mechanism, a motor and clutch unit for driving said machine, means for automatically controlling the operation of said machine to provide a predetermined plurality of lines of stitching in sequence on a workpiece, and manually operable means for interrupting the action of said first mentioned means to enable the introduction of at least one line of stitching under manual control in any desired relationship to said plurality of lines of stitching.

27. Sewing apparatus as set forth in claim 26 in which said manually operable means comprises a unit interconnected with said means for automatically controlling the operation of said machine for disabling said automatic control means and providing manual control over the operation of the machine.

28. Sewing apparatus as set forth in claim 27 in which said unit incorporates a plurality of elements for disabling certain devices incorporated in said automatic control means and for performing certain controls manually.

References Cited

UNITED STATES PATENTS

| | | |
|---|---|---|
| 2,971,483 | 2/1961 | Cordier. |
| 3,072,081 | 1/1963 | Milligan et al. |
| 3,080,836 | 3/1963 | Clemens et al. |
| 3,358,626 | 12/1967 | Bryan. |

JAMES R. BOLER, Primary Examiner

U.S. Cl. X.R.

112—102